(12) United States Patent
Ishigooka et al.

(10) Patent No.: US 11,372,706 B2
(45) Date of Patent: Jun. 28, 2022

(54) VEHICLE CONTROL DEVICE

(71) Applicant: HITACHI AUTOMOTIVE SYSTEMS, LTD., Hitachinaka (JP)

(72) Inventors: Tasuku Ishigooka, Tokyo (JP); Tomohito Ebina, Ibaraki (JP); Kazuyoshi Serizawa, Ibaraki (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 438 days.

(21) Appl. No.: 16/481,320

(22) PCT Filed: Mar. 15, 2018

(86) PCT No.: PCT/JP2018/010156
§ 371 (c)(1),
(2) Date: Jul. 26, 2019

(87) PCT Pub. No.: WO2018/173910
PCT Pub. Date: Sep. 27, 2018

(65) Prior Publication Data
US 2019/0354424 A1 Nov. 21, 2019

(30) Foreign Application Priority Data
Mar. 24, 2017 (JP) .............................. JP2017-058394

(51) Int. Cl.
*G06F 11/07* (2006.01)
*G06F 9/48* (2006.01)

(52) U.S. Cl.
CPC .......... *G06F 11/079* (2013.01); *G06F 9/4812* (2013.01); *G06F 11/0739* (2013.01)

(58) Field of Classification Search
CPC ............. G06F 11/0772; G06F 11/0739; G06F 9/4812; G06F 11/079
See application file for complete search history.

(56) References Cited

U.S. PATENT DOCUMENTS

| 4,096,564 A * | 6/1978 | Inose | ......................... G06F 9/52 710/264 |
| 6,401,197 B1 * | 6/2002 | Kondo | ...................... G06F 1/24 713/1 |

(Continued)

FOREIGN PATENT DOCUMENTS

| JP | 2001-323836 A | 11/2001 |
| JP | 4496205 B2 | 7/2010 |

(Continued)

OTHER PUBLICATIONS

International Search Report with English translation and Written Opinion issued in corresponding application No. PCT/JP2018/010156 dated Jul. 10, 2018.

*Primary Examiner* — Jonathan D Gibson
(74) *Attorney, Agent, or Firm* — Foley & Lardner LLP

(57) ABSTRACT

This invention detects deviations from design without hindering the real-time nature of interrupt processing, and assists in analyzing the impact of faults caused by unintentional interrupt processing, with the goal of curbing erroneous detection. In order to resolve this problem, this vehicle control device comprises; a deviation determination unit 129 which determines if execution timing of an execution body has deviated from design settings, and transitions to a monitoring state; and a run-time verification unit 130 which verifies the impact of deviation at timing which differs from that of the interrupt processing.

12 Claims, 12 Drawing Sheets

(56) References Cited

U.S. PATENT DOCUMENTS

| | | | |
|---|---|---|---|
| 9,921,937 B2* | 3/2018 | Seto | G06F 11/008 |
| 2005/0193271 A1* | 9/2005 | Linam | G06F 11/0772 |
| | | | 714/39 |
| 2006/0020949 A1 | 1/2006 | Hoshino | |
| 2007/0282568 A1* | 12/2007 | Yamashita | G01P 15/0891 |
| | | | 702/189 |
| 2008/0147949 A1 | 6/2008 | Miyake | |
| 2010/0174842 A1* | 7/2010 | Kimelman | G06F 9/4812 |
| | | | 711/132 |
| 2011/0209010 A1* | 8/2011 | Morimura | G06F 11/0709 |
| | | | 714/57 |
| 2014/0172227 A1 | 6/2014 | Tsukidate | |
| 2015/0082123 A1* | 3/2015 | Hartwich | G06F 11/0739 |
| | | | 714/768 |
| 2015/0205692 A1* | 7/2015 | Seto | G06F 11/008 |
| | | | 702/182 |
| 2015/0323608 A1* | 11/2015 | Jung | G06F 11/00 |
| | | | 702/58 |
| 2016/0034689 A1* | 2/2016 | Hilton | G06F 12/145 |
| | | | 714/57 |
| 2018/0157525 A1* | 6/2018 | Song | G06F 11/076 |
| 2019/0318288 A1* | 10/2019 | Noskov | G06N 20/00 |

FOREIGN PATENT DOCUMENTS

| | | |
|---|---|---|
| JP | 4874440 B2 | 2/2012 |
| JP | 2012-248022 A | 12/2012 |
| JP | 2013-41501 A | 2/2013 |
| JP | 2016-057969 A | 4/2016 |
| WO | WO 2016/013155 A1 | 1/2016 |

* cited by examiner

FIG. 2
| ID (1411) | SYSTEM STATUS (1412) | SOFT STATUS (1413) | CONSTRAINT EXPRESSION (1414) |
|---|---|---|---|
| 1 | 1 | 1 | 0b1100 |
| 2 | 1 | 2 | 0b0010 |
| 3 | 1 | 3 | 0b0000 |
| 4 | 2 | 1 | 0b0001 |
141
FIG. 3
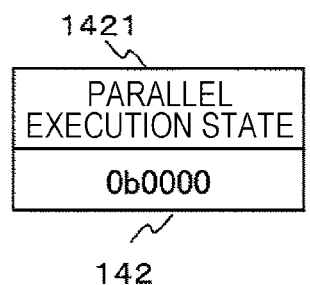
| PARALLEL EXECUTION STATE (1421) |
|---|
| 0b0000 |
142
FIG. 4
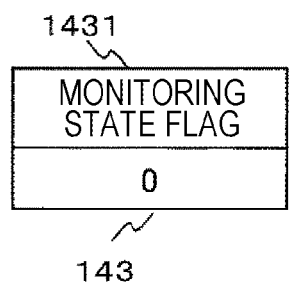
| MONITORING STATE FLAG (1431) |
|---|
| 0 |
143

FIG. 5

| STATE (1441) | CONSTRAINT EXPRESSION ID (1442) |
|---|---|
| 0b0000 | 0 |

| ID (1451) | IMPACT-ON-OTHER INFORMATION (1452) |
|---|---|
| 0b1000 | 1 |
| 0b0100 | 1 |
| 0x0010 | 0 |
| 0x0001 | 1 |

145

VEHICLE CONTROL DEVICE

TECHNICAL FIELD

The present invention relates to a technology that facilitates factor analysis of faults due to unexpected interrupt processing.

BACKGROUND ART

A vehicle control system is configured by ECUs, that is, electronic control units that operate a computerized vehicle control device, and controls a vehicle by cooperating via communication. The vehicle control device controls the entire vehicle by appropriately controlling an actuator on the basis of a state of a control target. In order to control in real time on the basis of a state of the control exit, it is necessary to perform interrupt processing that starts electronic control processing by an event caused by a sensor. However, due to an unexpected delay of a microcomputer or the like, interrupt processing may occur at timing at which the interrupt processing should not occur, which may cause a fault. Since it is difficult to trace a cause of a fault due to the interrupt processing from a result of a system status, there is a need for a technology that facilitates factor analysis. As a technology related to this, a technology for detecting deviation from state transition design has already been disclosed.

In PTL 1 below, state transition simulation is performed in interrupt processing to detect deviation from design, for the purpose of preventing system instability due to occurrence of unintentional interrupt processing.

In PTL 2 below, for the purpose of preventing system instability due to occurrence of unintentional interrupt processing, a monitoring microcomputer monitors an interrupt request signal of a target microcomputer and performs state transition simulation in accordance with the signal, thereby detecting deviation from design.

CITATION LIST

Patent Literature

PTL 1: JP 4874440 B2
PTL 2: JP 4496205 B2

SUMMARY OF INVENTION

Technical Problem

However, in PTL 1 described above, large overhead occurs for performing the state transition simulation in interrupt processing, which causes a problem that it is difficult to apply to a vehicle control device with a high interrupt frequency. PTL 2 described above is an invention for performing state transition simulation with a monitoring microcomputer in view of this problem of overhead.

However, with an increase in scale, complexity, and multi-core operation of control software, maintaining correctness of state transition design is becoming difficult, and both PTL 1 above and PTL 2 above have a problem that erroneous detections frequently occur since an error is immediately determined upon deviation from designed state transition.

The present invention has been made to resolve the above-mentioned problems, and it is an object of the present invention to detect deviations from design without hindering the real-time nature of interrupt processing, and assist in analyzing the impact of faults caused by unintentional interrupt processing, with the goal of curbing erroneous detection.

Solution to Problem

In order to resolve this problem, a vehicle control device according to the present invention includes, as an example, a deviation determination unit that determines if execution timing of an execution body has deviated from design settings, and transitions to a monitoring state; and a run-time verification unit that verifies the impact of deviation at timing that differs from timing of the interrupt processing.

Advantageous Effects of Invention

According to the vehicle control device of the present invention, since only deviation from the design is detected in interrupt processing and an impact of deviation is verified after the interrupt processing, it is possible to curb erroneous detection while securing the real-time nature. In addition, since a state at a time of deviation is notified together with an error code when an impact due to the deviation occurs, it becomes possible to easily identify a cause of the fault.

BRIEF DESCRIPTION OF DRAWINGS

FIG. 2 is an example of a constraint expression table.
FIG. 3 is an example of a parallel execution state.
FIG. 4 is an example of a monitoring state flag.
FIG. 5 is an example of a deviation state.
FIG. 6 is an example of execution body characteristic information.

DESCRIPTION OF EMBODIMENTS

A vehicle control device according to the present invention determines whether activation of an execution body deviates from design settings; causes transition to a monitoring state; verifies an impact of deviation at timing that differs from that of the interrupt processing in a monitoring state; and notifies a state at a time of deviation together with an error code when an error is detected in the monitoring state. Therefore, it is possible to curb erroneous detection while securing the real-time nature, and easily identify a cause of fault.

Hereinafter, an embodiment of the present invention will be described with reference to the drawings.

First Embodiment

In a first embodiment, a case where the present invention is applied to knock control of an engine control system will be described as an example.

Figure 1:
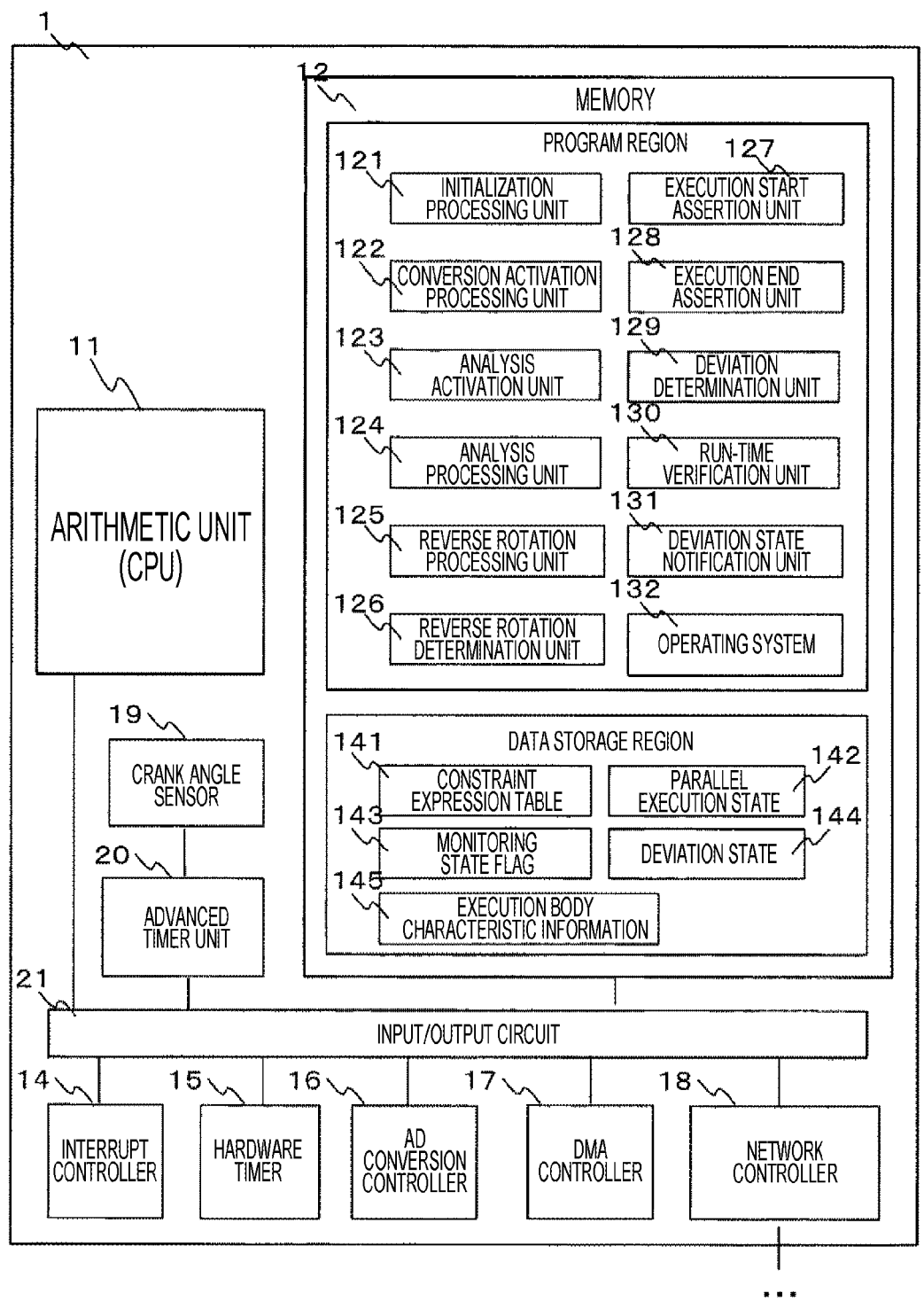
FIG. 1 is a configuration diagram of a vehicle control device according to a first embodiment.

FIG. 1 is a configuration diagram of a vehicle control device 1 according to the first embodiment of the present invention. The vehicle control device 1 includes an arithmetic unit (CPU) 11, a memory 12, an interrupt controller 14, a hardware timer 15, an analog/digital (AD) conversion controller 16, a direct memory address (DMA) controller 17, a network controller 18, a crank angle sensor 19, an advanced timer unit 20, and an input/output circuit 21. Although the arithmetic unit 11 is assumed to be a single core in the first embodiment, the present invention is not limited to this. For example, the arithmetic unit 11 may be a multicore such as dual core. A program region of the memory 12 has an initialization processing unit 121, a conversion activation processing unit 122, an analysis activation unit 123, an analysis processing unit 124, a reverse rotation processing unit 125, a reverse rotation determination unit 126, an execution start assertion unit 127, an execution end assertion unit 128, a deviation determination unit 129, a run-time verification unit 130, a deviation state notification unit 131, and an operating system 132; while a data storage region has a constraint expression table 141, a parallel execution state 142, a monitoring state flag 143, a deviation state 144, and execution body characteristic information 145. The network controller is an in-vehicle network such as Controller Area Network, FlexRay, or Ethernet. Further, the network controller may be wireless communication that communicates with the outside of a vehicle.

FIG. 2 is an example of the constraint expression table 141. An ID 1411 of the first embodiment indicates an ID that can identify a constraint expression in a specific system status and soft status. A system status 1412 indicates a state of the system. For example, in the first embodiment, 1 indicates that an engine is in a normal rotation state, and 2 indicates that the engine is in a reverse rotation state. A soft status 1413 indicates a soft status. For example, in the first embodiment, 1 indicates a sampling state, 2 indicates an analysis state, 3 indicates a waiting state, and 4 indicates a stop state. The constraint expression 1414 shows a constraint expression. For example, in the first embodiment, the presence or absence of execution of each execution body corresponds to a different bit of the constraint expression. For example, a crank angle sensor interruption corresponds to a fourth bit, an analysis activation corresponds to a third bit, analysis processing corresponds to a second bit, and a reverse rotation processing unit corresponds to the first bit. Although the constraint expression in the first embodiment is 4 bits, the present invention is not limited to this. For example, the constraint expression may be 32 bits or 64 bits.

FIG. 3 is an example of the parallel execution state 142. A parallel execution state 1421 indicates a state of the current execution body being executed in parallel.

FIG. 4 is an example of the monitoring state flag 143. A monitoring state flag 1431 indicates whether the current state is the monitoring state. For example, in the first embodiment, 0 of the monitoring state flag 1431 indicates being not in the monitoring state, and 1 indicates being in the monitoring state.

FIG. 5 is an example of the deviation state 144. A state 1441 indicates a parallel execution state at a time of deviation. A constraint expression ID 1442 corresponds to an ID 1411 of the constraint expression table 141. Although the constraint expression ID 1442 is made to correspond to the ID 1411 of the constraint expression table 141 in the first embodiment, the present invention is not limited to this. It is only necessary to be able to specify a constraint expression when used in deviation determination.

FIG. 6 is an example of the execution body characteristic information 145. An ID 1451 is an ID that can identify an execution body. Impact-on-other information 1452 indicates the presence or absence of the possibility of giving an impact to other execution bodies. In the first embodiment, 1 indicates giving an impact, and 0 indicates giving no impact. Giving an impact means that, for example, "interrupt processing indicated by the ID 1451 writes without exclusive control to a global variable shared with another task", but the present invention is not limited to this. For example, a case where an execution time is extended and the real-time nature is hindered, a case where an address is destroyed by DMA transfer, a case where a forced reset is applied, and the like may be defined as giving an impact.

Hereinafter, details of operation flows according to the first embodiment will be described.

Figure 7:
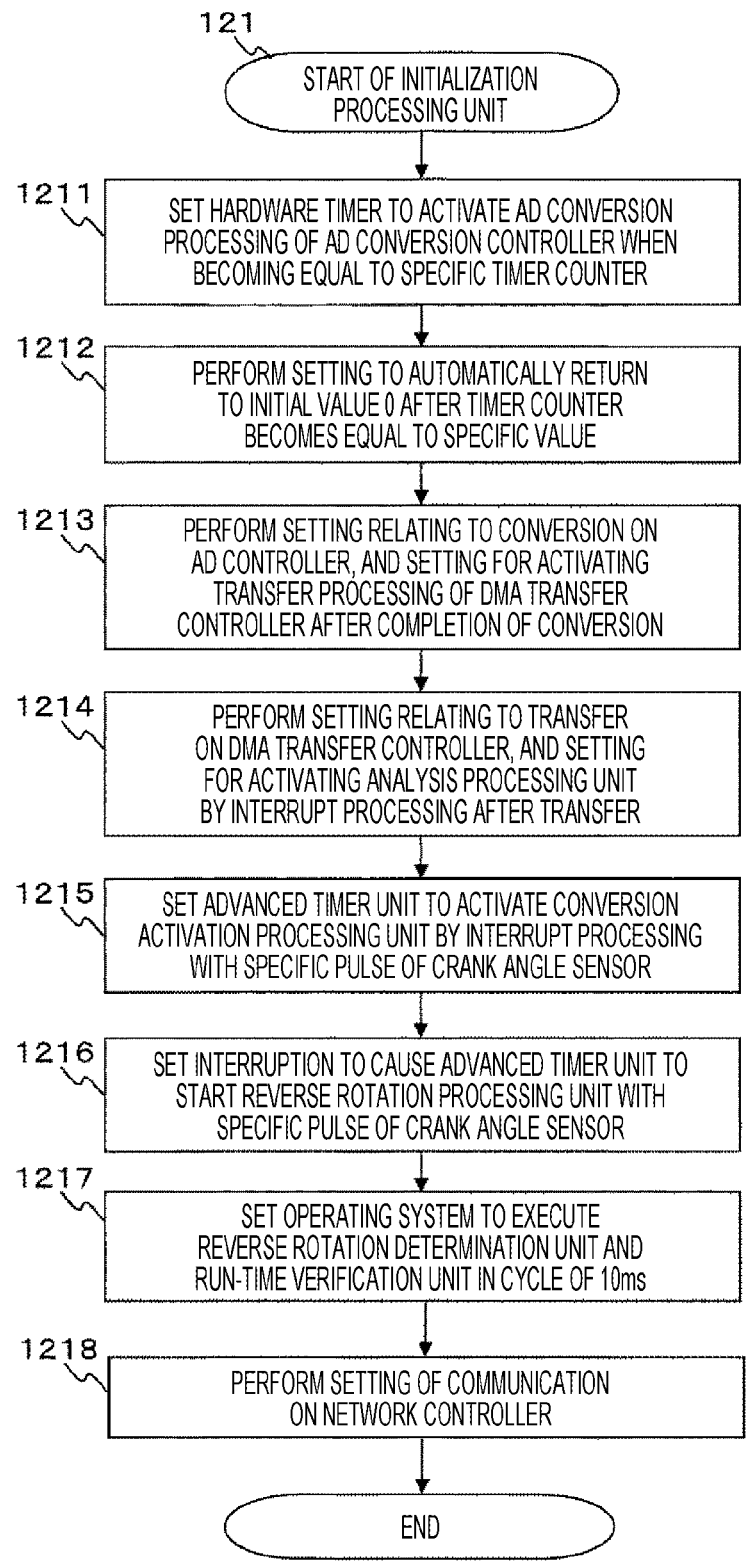
FIG. 7 is an operation flow of an initialization processing start unit.

FIG. 7 is an operation flow of the initialization processing unit 121. Each step of FIG. 7 is described below.

(FIG. 7: step 1211) The initialization processing unit 121 sets the hardware timer 15 to activate AD conversion processing of the AD conversion controller 16 when becoming equal to a specific timer counter.

(FIG. 7: step 1212) The initialization processing unit 121 performs setting to automatically return to the initial value 0 after the timer counter of the hardware timer 15 becomes equal to the value set in step 1211.

(FIG. 7: step 1213) The initialization processing unit 121 performs setting relating to AD conversion on the AD controller 16, and setting for activating transfer processing of the DMA transfer controller 17 after completion of the conversion.

(FIG. 7: step 1214) The initialization processing unit 121 performs setting relating to transfer on the DMA transfer controller 17, and setting for activating the analysis processing unit 123 by interrupt processing after the transfer.

(FIG. 7: step 1215) The initialization processing unit 121 sets the advanced timer unit 20 to activate the conversion activation processing unit 122 by interrupt processing with a specific pulse of the crank angle sensor 19.

(FIG. 7: step 1216) The initialization processing unit 121 sets the advanced timer unit 20 to activate the reverse rotation processing unit 125 by interrupt processing with a specific pulse of the crank angle sensor 19.

(FIG. 7: step 1217) The initialization processing unit 121 sets the operating system 132 to activate the reverse rotation determination unit 126 and the run-time verification unit 130 in a cycle of 10 ms.

(FIG. 7: step 1218) The initialization processing unit 121 performs setting of communication on the network controller 18.

Figure 8:
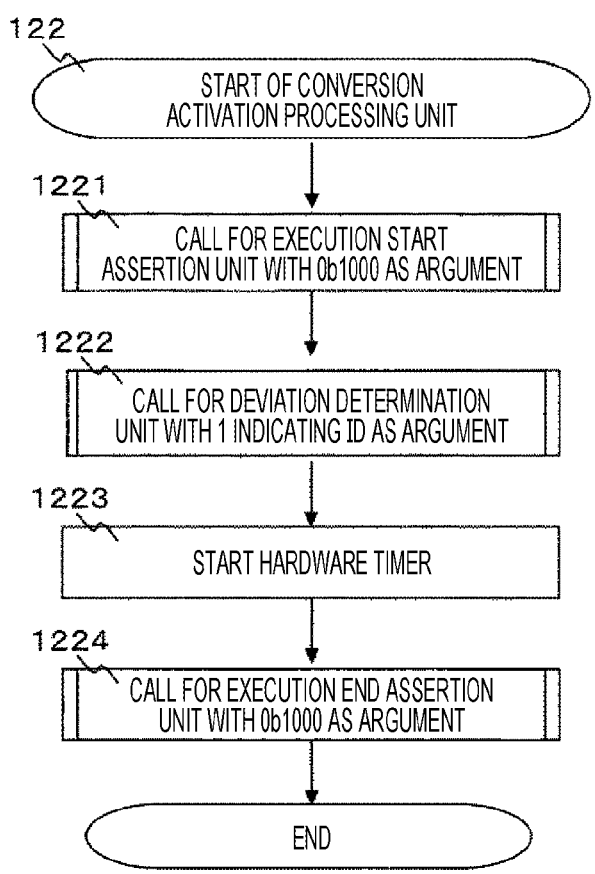
FIG. 8 is an operation flow of a conversion activation processing unit.

FIG. 8 is an operation flow of the conversion activation processing unit 122. Each step of FIG. 8 is described below.

(FIG. 8: step 1221) The conversion activation processing unit 122 calls the execution start assertion unit 127 with 0b1000 as an argument.

(FIG. 8: step 1222) The conversion activation processing unit 122 calls the deviation determination unit 129 with 1 indicating an ID as an argument.

(FIG. 8: step 1223) The conversion activation processing unit 122 activates the hardware timer 15.

(FIG. 8: step 1224) The conversion activation processing unit 122 calls the execution end assertion unit 128 with 0b1000 as an argument.

Figure 9:
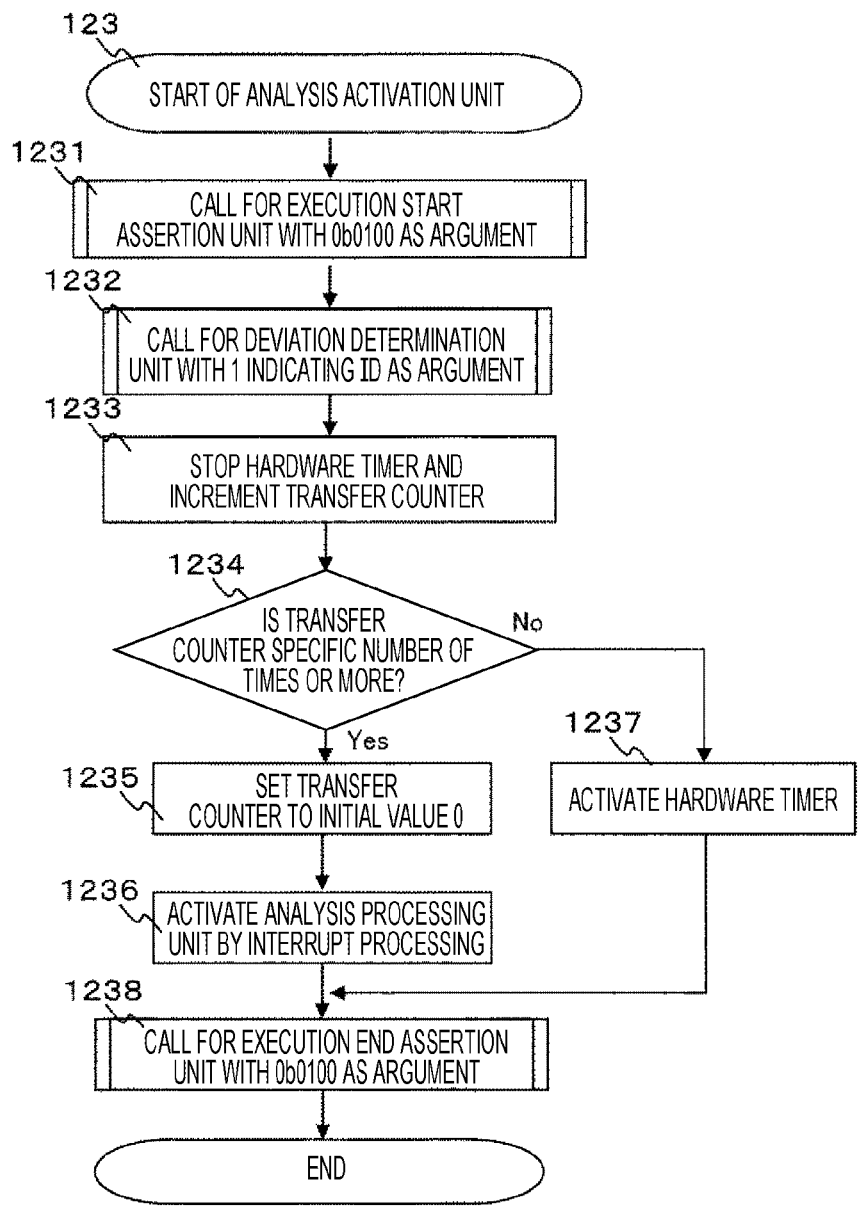
FIG. 9 is an operation flow of an analysis activation unit.

FIG. 9 is an operation flow of the analysis activation unit 123. Each step of FIG. 9 is described below.

(FIG. 9: step 1231) The analysis activation unit 123 calls the execution start assertion unit 127 with 0b0100 as an argument.

(FIG. 9: step 1232) The analysis activation unit 123 calls the deviation determination unit 129 with 1 indicating an ID as an argument.

(FIG. 9: step 1233) The analysis activation unit 123 stops the hardware timer 15 and increments a transfer counter.

(FIG. 9: step 1234) The analysis activation unit 123 determines whether the transfer counter is a specific number of times or more. When the determination result is true, the process proceeds to step 1235, and when the determination result is false, the process proceeds to step 1237.

(FIG. 9: step 1235) The analysis activation unit 123 sets the transfer counter to the initial value 0.

(FIG. 9: step 1236) The analysis activation unit 123 activates the analysis processing unit 124 by interrupt processing.

(FIG. 9: step 1237) The analysis activation unit 123 activates the hardware timer 15.

FIG. 9: step 1238) The analysis activation unit 123 calls the execution end assertion unit 128 with 0b0100 as an argument.

Figure 10:
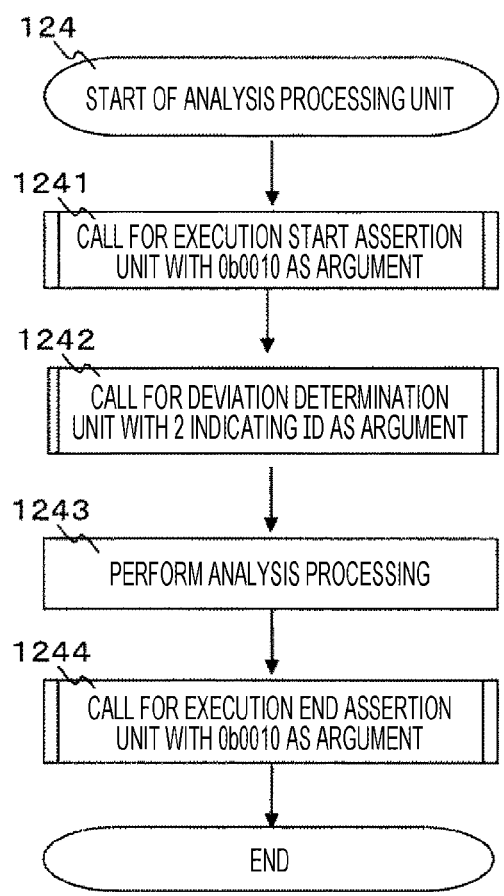
FIG. 10 is an operation flow of an analysis processing unit.

FIG. 10 is an operation flow of the analysis processing unit 124. Each step of FIG. 10 is described below.

(FIG. 10: step 1241) The analysis processing unit 124 calls the execution start assertion unit 127 with 0b0010 as an argument.

(FIG. 10: step 1242) The analysis processing unit 124 calls the deviation determination unit 129 with 2 indicating an ID as an argument.

(FIG. 10: step 1243) The analysis processing unit 124 performs analysis processing.

(FIG. 10: step 1244) The analysis processing unit 124 calls the execution end assertion unit 128 with 0b0010 as an argument.

Figure 11:
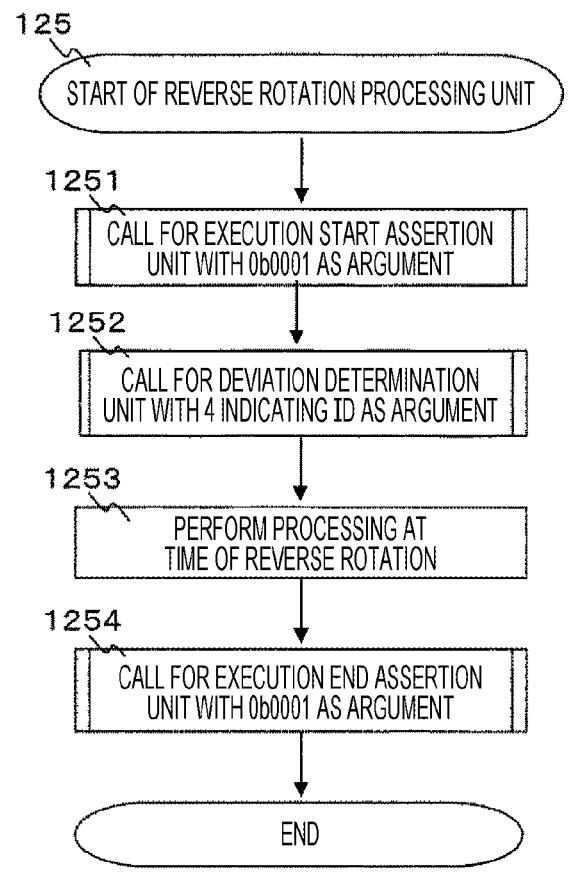
FIG. 11 is an operation flow of a reverse rotation processing unit.

FIG. 11 is an operation flow of the reverse rotation processing unit 125. Each step of FIG. 11 is described below.

(FIG. 11: step 1251) The reverse rotation processing unit 125 calls the execution start assertion unit 127 with 0b0001 as an argument.

(FIG. 11: step 1252) The reverse rotation processing unit 125 calls the deviation determination unit 12 with 4 indicating an ID as an argument.

(FIG. 11: step 1253) The reverse rotation processing unit 125 performs processing at a time of reverse rotation. For example, since knock control becomes unnecessary at the time of reverse rotation, the process is stopped, and initialization is performed.

(FIG. 11: step 1254) The reverse rotation processing unit 125 calls the execution end assertion unit 128 with 0b0010 as an argument.

Figure 12:
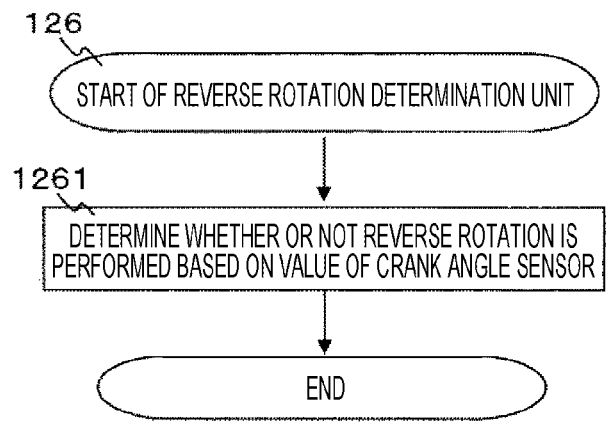
FIG. 12 is an operation flow of a reverse rotation determination unit.

FIG. 12 is an operation flow of the reverse rotation determination unit 126. Each step of FIG. 12 is described below.

(FIG. 12: step 1261) The reverse rotation determination unit 126 determines whether or not reverse rotation is performed, on the basis of a value of the crank angle sensor 19.

Figure 13:
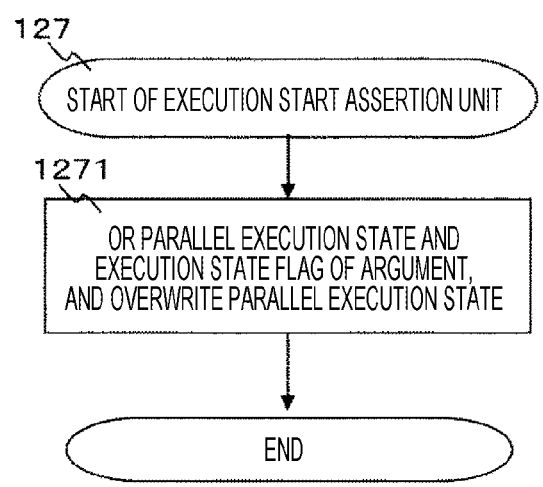
FIG. 13 is an operation flow of an execution start assertion unit.

FIG. 13 is an operation flow of the execution start assertion unit 127. Each step of FIG. 13 is described below.

(FIG. 13: step 1271) The execution start assertion unit 127 ORs the parallel execution state 142 and the execution state flag of the argument, and overwrites the parallel execution state 142. Since the first embodiment is a single core, only a state of an execution body executed in series is stored in the parallel execution state, but the present invention is not limited to this. For example, in a case of multi-core, a state of an execution body executed in parallel is stored. Further, in a case of using FPGA or GPGPU, they are also managed as a state of the execution body. Moreover, the present invention is not limited to these.

Figure 14:
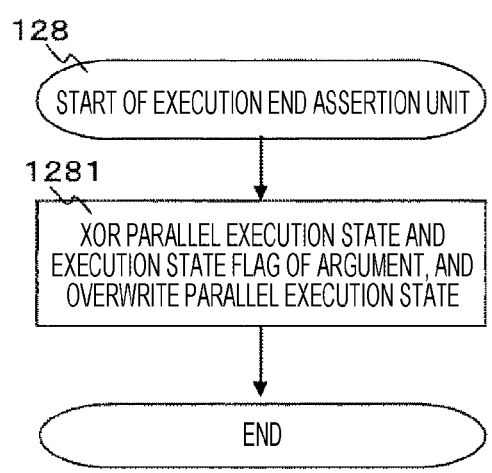
FIG. 14 is an operation flow of an execution end assertion unit.

FIG. 14 is an operation flow of the execution end assertion unit 128. Each step of FIG. 14 is described below.

(FIG. 14: step 1281) The execution end assertion unit 128 XORs the parallel execution state 142 and the execution state flag of the argument, and overwrites the parallel execution state 142.

Figure 15:
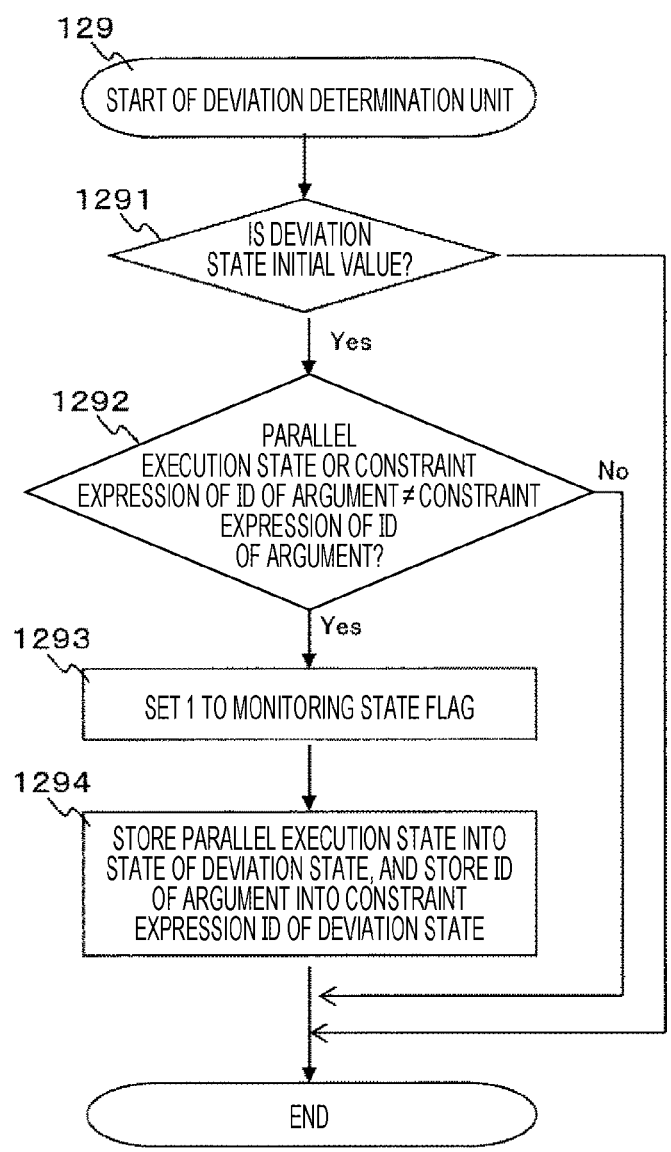
FIG. 15 is an operation flow of a deviation determination unit.

FIG. 15 is an operation flow of the deviation determination unit 129. Each step of FIG. 15 is described below.

(FIG. 15: step 1291) The execution end assertion unit 129 determines whether the deviation state 144 is an initial value. When the determination result is true, the process proceeds to step 1292, and when the determination result is false, the operation flow is ended.

(FIG. 15: step 1292) The execution end assertion unit 129 determines whether the result of OR-ing of the parallel execution state 142 and the constraint expression 1414 corresponding to the ID of the argument is not equal to the constraint expression 1414 corresponding to the ID of the argument. When the determination result is true, the process proceeds to step 1293, and when the determination result is false, the operation flow is ended.

(FIG. 15 step 1293) The execution end assertion unit 129 sets 1 to the monitoring state flag 143.

(FIG. 15: step 1294) The execution end assertion unit 129 stores the parallel execution state into the state 1431 of the deviation state 143, and stores the ID of the argument into the constraint expression ID 1432 of the deviation state 143.

Figure 16:
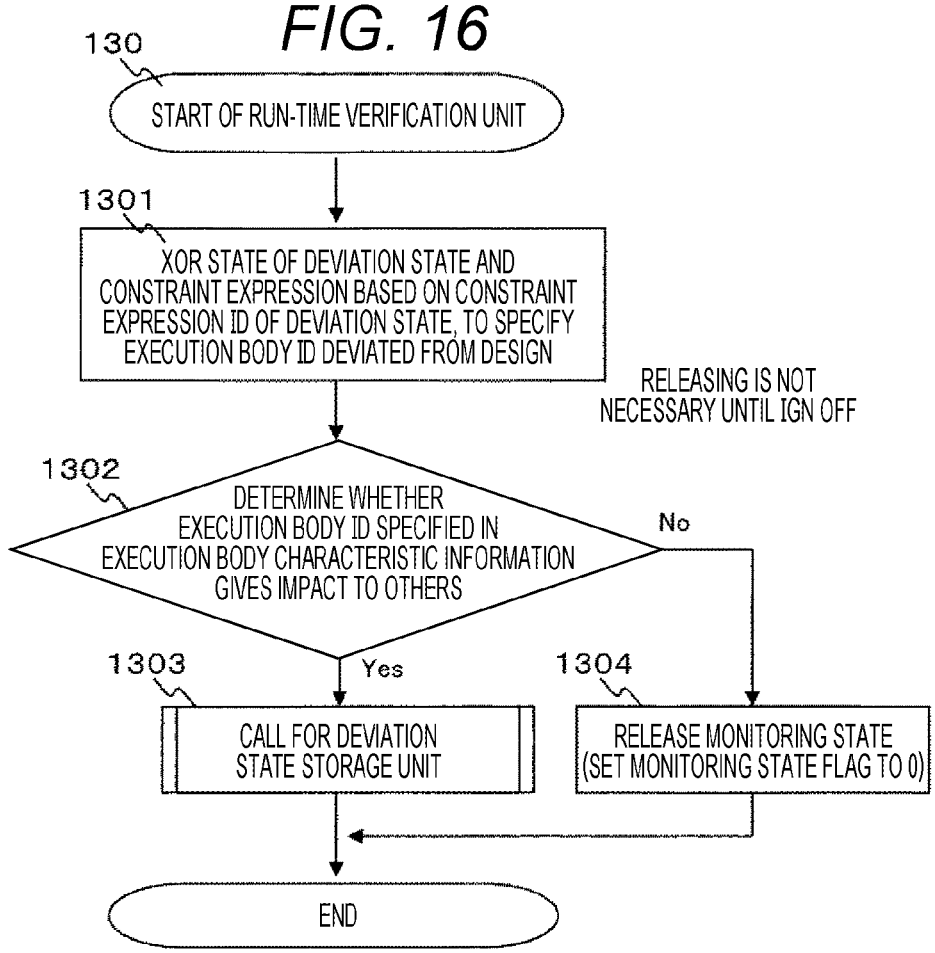
FIG. 16 is an operation flow of a run-time verification unit.

FIG. 16 is an operation flow of the run-time verification unit 130. Each step of FIG. 16 is described below.

(FIG. 16: step 1301) The run-time verification Unit 130 XORs the state 1431 of the deviation state 143 and the constraint expression 1414 based on the constraint expression ID 1432 of the deviation state, to specify an execution body ID deviated from the design.

(FIG. 16: step 1302) The run-time verification unit 130 determines whether the execution body ID specified in the execution body characteristic information 145 gives an impact to others. When the determination result is true, the process proceeds to step 1303, and when the determination result is false, the process proceeds to step 1304.

(FIG. 16: step 1303) The run-time verification unit 130 calls a deviation state storage unit 131a.

(FIG. 16: step 1304) The run-time verification unit 130 releases the monitoring state by setting the monitoring state flag to 0.

Figure 17:
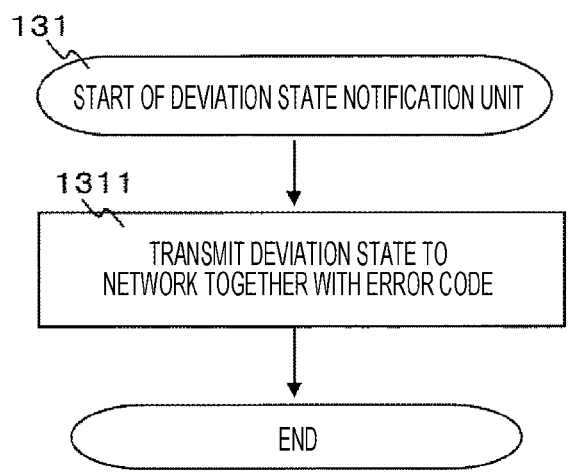
FIG. 17 is an operation flow of a deviation state notification unit.

FIG. 17 is an operation flow of the deviation state notification unit 131. Each step of FIG. 17 is described below.

(FIG. 17: step 1311) The deviation state notification unit 131 transmits the deviation state 143 to the network together with an error code indicating a cause of the fault. Although the first embodiment performs notification by transmitting the deviation state to the network, the present invention is not limited to this. For example, the deviation state may be stored as a log, and the log may be referred to at the time of maintenance or software update. Alternatively, a server outside the vehicle may be notified by wireless communication.

Figure 18:
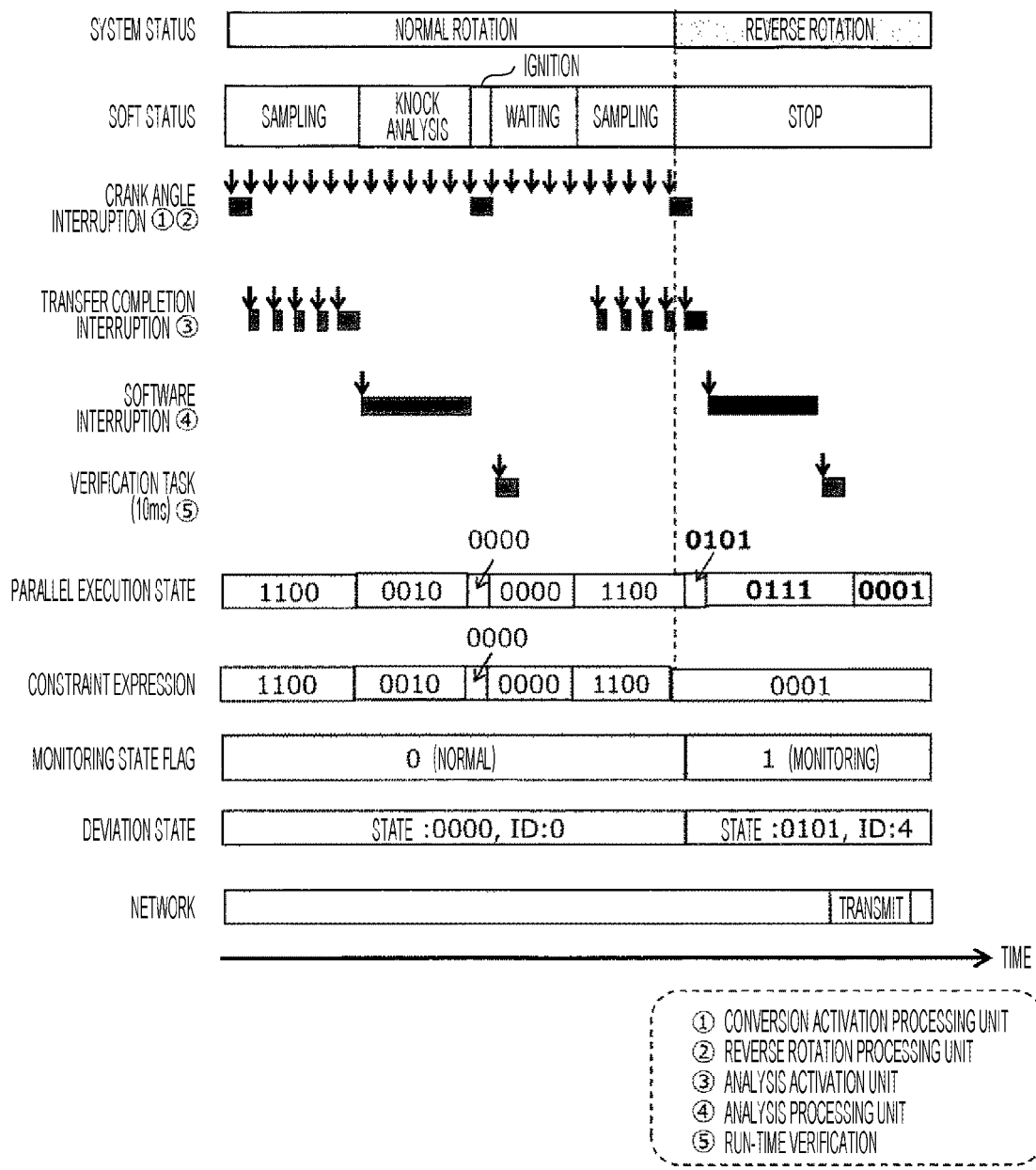
FIG. 18 is an operation scenario of the vehicle control device according to the first embodiment.

FIG. 18 is an operation scenario as an example of the vehicle control device 1 according to the first embodiment. A system status represents a state of the engine, and as a soft status, state transition in accordance with a state of the system is performed.

In the first embodiment, sampling, knock analysis, ignition, and waiting for sampling timing are repeated in a case of normal rotation, and processing is stopped in a case of reverse rotation. Crank angle interruption is activated with a specific pulse, and in accordance with the pulse, an appropriate processing unit of the conversion activation processing unit 122 and the reverse rotation processing unit 125 is selected and executed. Although the selection is made in this manner in the first embodiment, the present invention is not limited to this. For example, execution may be at same timing. Transfer completion interruption is activated at the end of the DMA transfer, and executes the analysis activation unit 123. The software interruption is issued by the analysis activation unit 123, and executes the analysis processing unit 124. A verification task is periodically executed by the operating system, and executes the run-time verification 130. The verification task is executed with low priority so as not to hinder the real-time nature of other interrupt processing. In the first embodiment, although the method of executing the run-time verification 130 with lower priority than that of the interrupt processing is adopted, the present invention is not limited to this, as long as the real-time nature is not hindered. For example, the run-time verification 130 may be executed immediately after the interrupt processing. However, a deadline that must be executed by run-time verification must be executed within the time of Diagnostic Test Interval in the fault tolerant time interval (FTTI) defined in the functional safety standard ISO 26262. The parallel execution state indicates a change of a value of the parallel execution state 142, and a constraint expression indicates a change of the constraint expression 1414 corresponding to a system status and a soft status at that timing. The monitoring state flag indicates a change of a value of the monitoring state flag 143, and a deviation state indicates a change of a value of the deviation state 144. The network indicates a state of the network controller 18.

In the first embodiment, initialization is performed to stop the AD conversion controller 16 when a state of the crank angle is just at timing to execute the reverse rotation processing unit at timing when the system status changes to reverse rotation. However, if AD conversion is in progress at this time, the stop instruction is not accepted, and the AD conversion controller 16 is stopped after completion of the conversion. However, a scenario is shown in which it is detected that an unexpected interruption has occurred because DMA transfer occurs due to conversion completion. Although such an example is used in the first embodiment, the present invention is not limited to this. For example, the present invention can be applied to a multi-core microcomputer, a many-core microcomputer, an FPGA mounted microcomputer, and the like. In this scenario, the analysis activation unit 123 detects deviation from the design, and transition is made to the monitoring state. Thereafter, an impact of the fault is verified by the run-time verification unit 130, and the deviation state is notified via the network as the result is true.

In the first embodiment, processing overhead can be reduced since deviation from the design is detected in the parallel execution state described in the constraint expression. By describing in the constraint expression, it becomes possible to confirm only the outline of deviation from design, and to investigate an impact of the deviation in detail in addition to interrupt processing, enabling the real-time nature of interrupt processing to be ensured.

In the first embodiment, it is not determined whether the parallel execution state satisfies the constraint expression only in the deviation determination unit 129, but the present invention is not limited to this. For example, the additional determination may be performed by the run-time verification unit 130 with a more detailed constraint expression. For example, the deviation determination unit 129 may determine a parallel execution state in a task level, and the run-time verification unit 130 may determine the parallel execution state in function level.

Furthermore, for example, in a case of such a system using a task chain in which a task activates another task, the deviation determination unit 129 may determine a parallel execution state of tasks activated first by the deviation determination unit 129, and the run-time verification unit 130 may determine a parallel execution state including a second and subsequent tasks.

In the first embodiment, the method of detecting deviation from the design is not limited to the constraint expression. For example, state transition simulation may be adopted.

In the first embodiment, only one constraint expression table is prepared, but the present invention is not limited to this. The number of constraint expression tables may be two or more.

In the first embodiment, the deviation determination unit 129 and the run-time verification unit 130 are mounted on a same ECU as the vehicle control device to be monitored, but the present invention is not limited to this. For example, determination may be performed during execution in parallel on another computer, or determination may be performed by analyzing an operation log.

In the first embodiment, even if deviation from deviation is detected, processing against abnormality, such as fail-safe, is not immediately executed. Therefore, an availability decrease due to erroneous detection can be prevented.

In the first embodiment, when the run-time verification unit 130 determines that there is no impact of the fault, the monitoring state flag is cleared and the monitoring state is released, but the present invention is not limited to this. For example, the monitoring state may not be released, or may be released as the system is turned OFF. Moreover, the present invention is not limited to these.

The first embodiment describes a method in which the deviation state is overwritten, but the present invention is not limited to this. The state after the deviation determination may be continuously stored in chronological order. Moreover, the present invention is not limited to these.

In the first embodiment, the deviation state is notified when the run-time verification unit 130 determines that there is an impact of the fault, but the present invention is not limited to this. The deviation state may be stored, or fail-safe processing may be performed.

As described above, according to the first embodiment, the deviation determination unit 129 determines whether activation of the execution body deviates from design settings and causes transition to a monitoring state, the run-time verification unit 130 verifies an impact of deviation at timing that differs from that of the interrupt processing in the monitoring state, and the deviation state notification unit 131 notifies a state at a time of deviation together with an error code when an error is detected in the monitoring state. Therefore, it is possible to detect deviations from design without hindering the real-time nature of interrupt processing, and to prevent availability decrease due to erroneous detection, so that it is suitable for a vehicle control system requiring real-time nature and high reliability. In addition, since a cause of a fault can be easily identified, it is suitable for a vehicle control system requiring safety.

REFERENCE SIGNS LIST

129 deviation determination unit
130 run-time verification unit
131*a* deviation state storage unit
131 deviation state notification unit

The invention claimed is:

1. A vehicle control device comprising a processor and a memory, the processor being configured to:
   determine whether execution timing of an execution body has deviated from a design setting;
   transition to a monitoring state;
   verify an impact of deviation of the execution timing that differs from a timing of interrupt processing; and
   in response detecting an error in the monitoring state, cause an output of a notification of a state at a time of deviation together with an error code indicating a cause of the error,
   wherein determining whether the execution timing has deviated from the design setting includes comparing the execution timing with a constraint expression including a parallel execution constraint of the execution body.

2. The vehicle control device according to claim 1, the memory being further configured to store the state at the time of deviation together with the error code when the error is detected in the monitoring state.

3. The vehicle control device according to claim 1, wherein the execution body is at least one of interrupt processing, a task, or circuit processing.

4. The vehicle control device according to claim 1, wherein the state at the time of deviation is an execution situation of the execution body.

5. The vehicle control device according to claim 1, wherein the parallel execution constraint is a group of a task and interrupt processing for which parallel execution is simultaneously permitted.

6. The vehicle control device according to claim 1, wherein the parallel execution constraint includes a serial execution constraint in a same core.

7. The vehicle control device according to claim 1, wherein the parallel execution constraint also includes processing in a multi-core, processing of a GPU, and processing of an FPGA.

8. The vehicle control device according to claim 1, wherein the timing that differs from the timing of the interrupt processing results from one of: that the verification of the impact of deviation is executed at a time when the interrupt processing is not executed, the verification of the impact of deviation is executed at an end time of the interrupt processing, or the verification of the impact of deviation is executed at a time having a lower priority than a priority of the interrupt processing.

9. The vehicle control device according to claim 1, wherein the processor and the memory are further configured to determine deviation based on a state transition event of each state.

10. The vehicle control device according to claim 9, wherein the processor and the memory determine deviation based on the state transition event by a state transition simulation.

11. The vehicle control device according to claim 1, wherein a program to be monitored is a program for which state transition is designed.

12. A design verification support device comprising a processor and a memory which stores executable instructions, which, on execution, cause the processor to:
    access a log of an execution state of an execution body;
    determine, from a design in the log of the execution state of the execution body, whether a deviation in execution timing from a design setting has occurred;
    perform a run-time verification that verifies an impact of deviation at execution timing that differs from timing of interrupt processing; and
    in response detecting an error when verifying the impact of deviation of execution timing, output a notification of a state at a time of deviation together with an error code indicating a cause of the error,
    wherein determining whether the execution timing has deviated from the design setting includes comparing the execution timing with a deviation state stored in the log.

* * * * *